J. THISSEN.
RESILIENT TIRE.
APPLICATION FILED SEPT. 6, 1911.
1,024,753.
Patented Apr. 30, 1912.
2 SHEETS—SHEET 1.
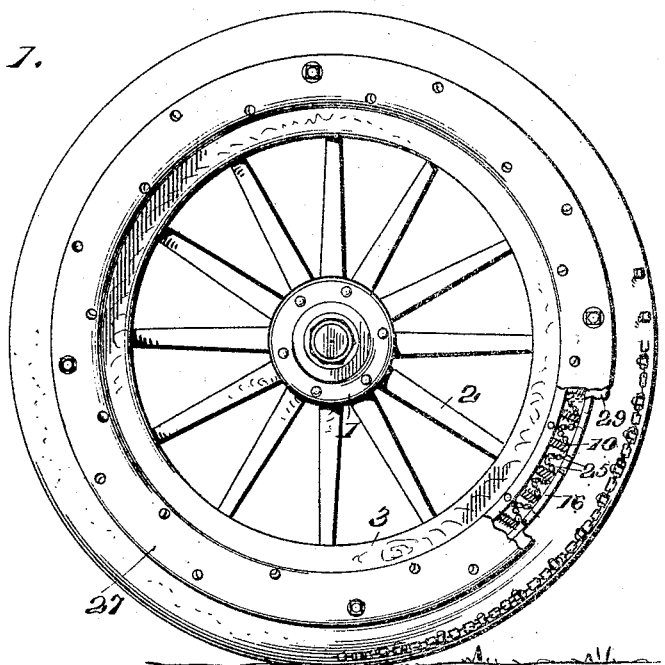
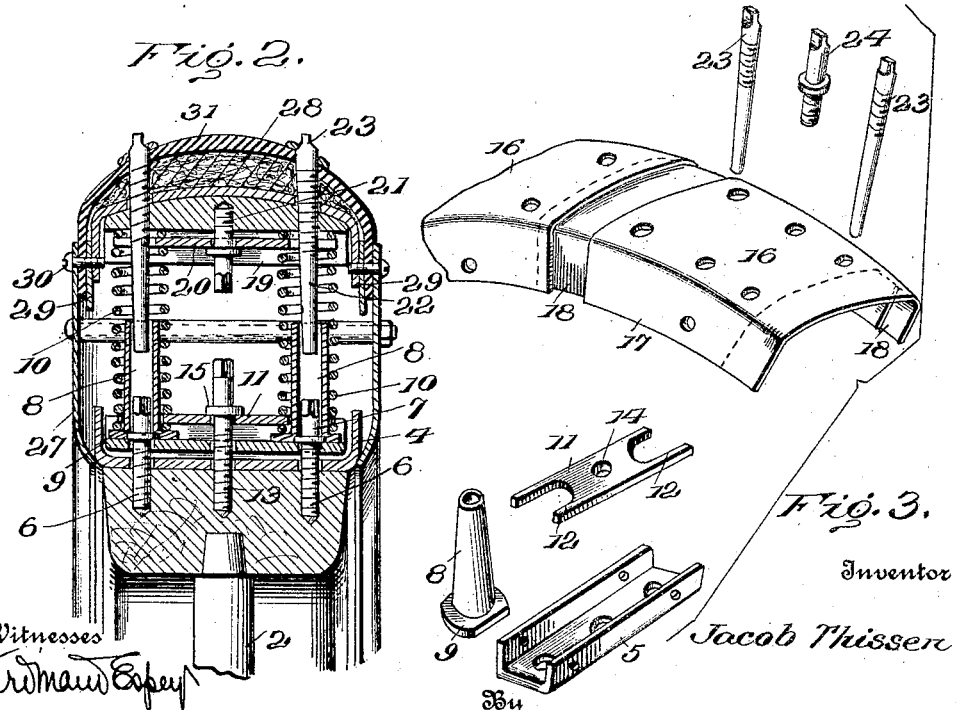
Inventor
Jacob Thissen

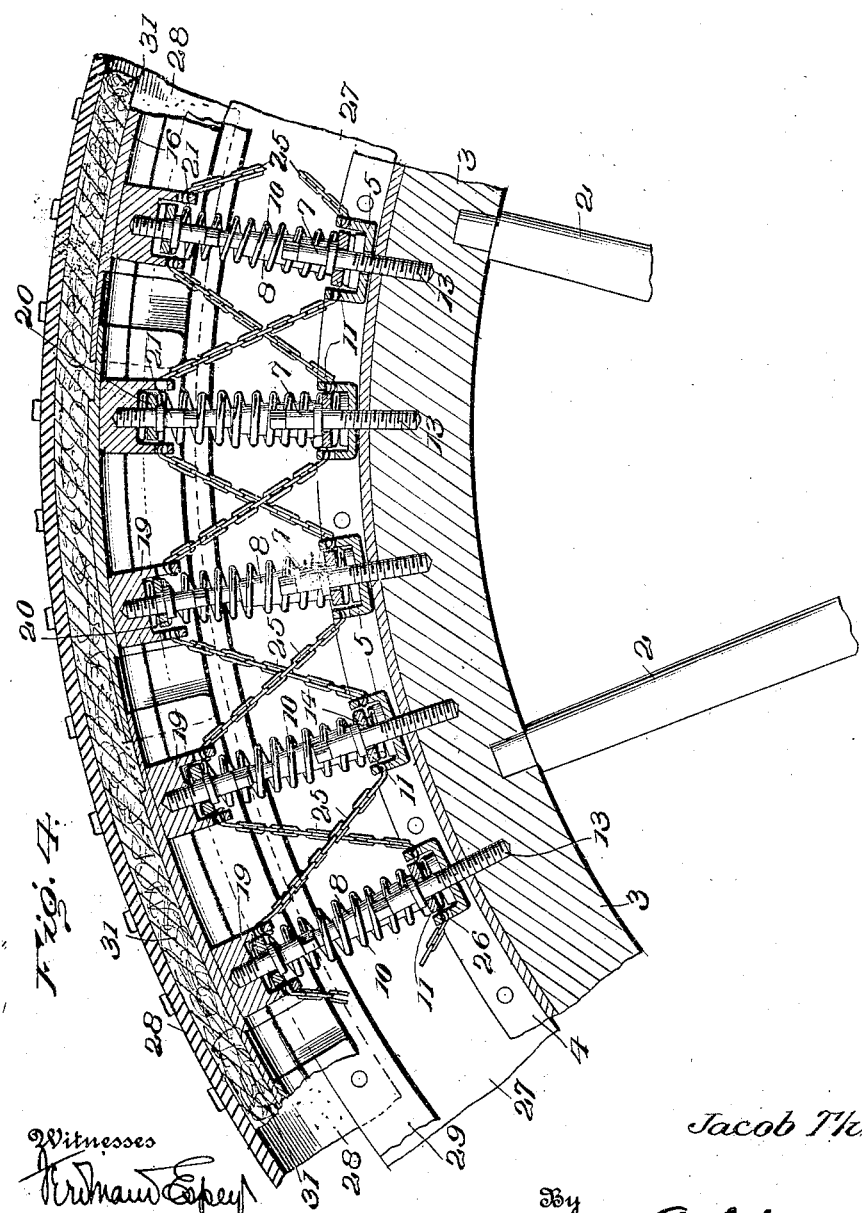

UNITED STATES PATENT OFFICE.

JACOB THISSEN, OF KANE, PENNSYLVANIA.

RESILIENT TIRE.

1,024,753.   Specification of Letters Patent.   Patented Apr. 30, 1912.

Application filed September 6, 1911. Serial No. 647,991.

*To all whom it may concern:*

Be it known that I, JACOB THISSEN, citizen of the United States, residing at Kane, in the county of McKean and State of Pennsylvania, have invented certain new and useful Improvements in Resilient Tires, of which the following is a specification.

This invention comprehends certain new and useful improvements in resilient tires, and the invention has for its primary object a simple, durable and efficient construction of tire which will possess substantially all of the characteristics that are incidental to the ordinary pneumatic and cushion rubber tires, without the accompanying liability to become punctured and otherwise damaged in service, and the invention also has for its object to generally improve tires of the spring type and to render them more useful and commercially desirable.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a side elevation of a wheel equipped with my improved tire; Fig. 2 is an enlarged transverse sectional view through the tire; Fig. 3 illustrates some of the detail parts detached in juxtaposition to each other; and Fig. 4 is an enlarged longitudinal section of a portion of the tire.

Corresponding and like parts are referred to in the following description and indicated in all the views of the drawings by the same reference characters.

Referring to the drawings, the numeral 1 designates the hub, 2 the spokes, and 3 the felly of a wheel, all of these parts being of any conventional or desired type and construction.

Encircling the felly 3 is a preferably steel channeled inner rim 4 which carries any desired number of transversely extending channeled blocks 5 formed integrally therewith or secured thereto in any desired way. In the present instance these blocks 5 are secured to the rim 4 by threaded pins 6 formed intermediate of their ends with retaining collars 7 and preferably screwing into the felly 3 so as to not only secure the blocks 5 to the rim, but to also assist in securing the rim to the felly. Preferably, tapering tubes 8 are mounted within the channeled blocks 5, said tubes in the present instance being arranged in transversely disposed pairs, as best illustrated in Fig. 2, and being formed at their inner ends with heads 9 which fit snugly in the channel blocks 5, whereby they are prevented from turning therein. The outer ends of the pins 6 project into the tubes 8, as shown. The tubes 8 are encircled by helical springs 10, the inner ends of said springs bearing upon the heads 9 of the tubes and the springs being held thereon by means of yoke plates 11, the recessed ends 12 of which engage the inner ends of the springs, as shown, and thereby securely hold them upon the heads 9. The yoke plates 11 are held in place by pins 13 passing through apertures 14 formed in the yoke plates and passing through the blocks 5 and screwing in the felly 3, the pins 13 being formed intermediate of their ends with collars 15 that bear against the yoke plates and being provided at their outermost ends with square or other many-sided heads, whereby a wrench may be easily applied thereto. It will thus be seen at this point that the yoke plates 11 not only secure the inner ends of the springs in place, but also serve to securely hold the tubes 8 in the channeled blocks 5.

The outer rim of my improved tire is spaced from the inner rim 4 and comprises any desired number of transversely bowed segmental plates 16 that are formed with side flanges 17 and that slightly overlap at the ends, as best illustrated in Fig. 3, the overlapping ends being correspondingly chamfered for this purpose, as indicated at 18. At points corresponding to the location of the channeled blocks 5, these plates 16 are formed with transversely extending flanges 19 arranged in pairs, and the outer ends of the springs 10 are received between said flanges and are held therein by yoke plates 20 corresponding to the yoke plates 11. The plates 20 are secured in place by retaining pins 21.

22 designates pins that are complemental to the pins 6, the pins 22 being preferably secured by screw threaded engagement in the plates 16 and having their inner ends mounted for radial movement in the outer ends of the tubes 8. In addition to their function as guide pins, the pins 22 serve as non-skid devices, their outer ends being preferably beveled, as at 23, to form spikes or spurs which project from the tread service of the tire. Between every two pairs of pins 22, in the preferred embodiment of the invention, are a number of corresponding but preferably shorter pins 24, screw threaded at their inner ends to work in the plates 16 and thereby be held in position.

In order to assist in holding the parts in position as against circumferential strain, I have provided chains 25 that extend obliquely from the outer rim to the inner rim, said chains in the present instance being hooked at their ends, as at 26, the hooked end links being secured in openings formed in the flanges 19 and flanges of the channeled blocks 5, respectively. There are two of these chains provided for each spring and its correlated parts.

In order to protect the parts from dust and to add to the attractive appearance of the tire, I provide a casing which in the present embodiment of the device consists of side plates 27 secured in any desired way to the opposite sides of the rim 4 and felly 3, and a tread element 28 of leather or any other desired substance or material, the side edges of said tread element being clamped in between the outer sides of the plates 27 and rings 29, screws or similar fastening devices, as indicated at 30, passing through the side plates 27, rings 29 and interposed leather or the like. Preferably, the plates 16 are somewhat flat, transversely considered, and the space between said plates and the tread element 28 is taken up by a filling 31 of cotton yarn or any other substance, so as to impart a properly rounded tread surface and at the same time add somewhat to the resiliency of the device, although it is to be understood that the invention is not limited to this construction and arrangement of parts, as the resiliency is obtained primarily by the springs 10 interposed between the inner and outer rims of the tire.

From the foregoing description in connection with the accompanying drawings, the operation of my improved spring tire will be apparent.

In the practical use of the device, any stress or shock imparted to the tread surface of the tire at any point will cause the pins 22 at such point to move inwardly in the tubes 8, the corresponding springs 10 being thereby compressed. It is obvious that the chains 25 add to the stability of the tire, while at the same time they do not detract in any wise from the spring characteristics thereof.

While the accompanying drawings illustrate what I believe to be the preferred embodiment of my invention, it is to be understood that the invention is not limited thereto, but that various changes may be made in the construction, arrangements and proportions of the parts without departing from the scope of the invention as defined in the appended claims.

Preferably, the side plates 27 are connected together at any desired intervals by tie bolts 35, said bolts being encircled by tubes 36 within the casing, the ends of the tubes abutting against the inner or opposing faces of the side plates 27, whereby the casing is reinforced against spreading and crushing strains.

Having thus described the invention, what is claimed as new is:

1. A spring tire, embodying an inner rim provided with a plurality of transversely extending channels, pins projecting outwardly in a radial direction from said rim in said channels, tubes mounted in said channels over the pins and held in the channels, an outer sectional rim, pins projecting inwardly from the sectional rim and working in the outer ends of said tubes, and springs encircling said pins and tubes.

2. A tire, embodying an inner rim provided with a plurality of transversely extending channeled blocks, an outer sectional rim provided with a plurality of correspondingly located blocks, the sides of said blocks being formed with apertures, chains having hooked ends engaging in the sides of the channeled blocks, the chains extending obliquely, as specified, and springs interposed between said rims.

In testimony whereof I affix my signature in presence of two witnesses.

JACOB THISSEN. [L. S.]

Witnesses:
W. N. WOODSON,
FREDERICK S. STITT.